United States Patent [19]

Blair

[11] 4,318,965
[45] Mar. 9, 1982

[54] BI-METALLIC THERMO-BARRIER MATERIAL AND METHOD OF WELDING

[75] Inventor: Winford Blair, La Mesa, Calif.

[73] Assignee: Rohr Industries, Inc., Chula Vista, Calif.

[21] Appl. No.: 165,276

[22] Filed: Jul. 2, 1980

[51] Int. Cl.³ .......................... B23B 3/12; B23V 1/04
[52] U.S. Cl. ................................ 428/593; 219/78.02; 219/78.12; 219/85 E; 219/85 M; 228/181; 428/594
[58] Field of Search ................. 428/73, 178, 593, 594, 428/174; 219/78.11, 78.12, 78.02, 85 E, 85 M; 228/181

[56] References Cited

U.S. PATENT DOCUMENTS 3,151,712 10/1964 Jackson .............................. 428/174
3,957,194 5/1976 Woodward ......................... 228/181

FOREIGN PATENT DOCUMENTS 54-18232 7/1979 Japan .................................. 228/181

Primary Examiner—Elliot A. Goldberg
Attorney, Agent, or Firm—Patrick J. Schlesinger; Frank D. Gilliam

[57] ABSTRACT

The manufacturing of multi-layer bi-metallic thermo-barrier material utilizing combined brazing and difusion bonding methods of joining together the components of the barrier material.

10 Claims, 5 Drawing Figures

BI-METALLIC THERMO-BARRIER MATERIAL AND METHOD OF WELDING

BACKGROUND OF THE INVENTION

This invention relates to a lightweight thermo-barrier material and more particularly a multilayer sandwich material for use as a thermal barrier in space reentry vehicles or the like and other terminal barrier applications.

Prior art thermal barrier material used in spacecraft and the like consists of ceramic or graphite composite structure, both of which are extremely fragile and easily damaged. Generally, due to the curvilinear contours of space vehicles, the thermo-barrier material generally takes the form of flat and contoured small rectangular tiles. These small tiles allow for attachment to curvilinear attachment surface and allow for individual repair or replacement when localized damage occurs. It has been found that during vehicle testing, handling, etc., these tiles are continually becoming broken and require replacement. During replacement, additional tiles generally get broken in the repair process, thus further increasing the cost of repairs and possibly causing critical vehicle flight schedules to be missed. The actual thermo-barrier material of the prior art devices have been substantially successful in isolating thermal transfer from outer surfaces to the inner surfaces of the vehicle.

There has not been an adequate lightweight high strength material for use as thermo-barrier structures, particularly in spacecraft environment until the emergence of the instant invention.

SUMMARY OF THE INVENTION

The invention comprises a multilayer cellular core material constructed of titanium alloys, inconel, TD nickel, columbium, and other super alloys, aluminum or the like or a combination of two different types of construction material, such as, titanium in combination with inconel. When a single type of material is used, such as titanium, diffusion bonding is the preferred method of joining the components of the multilayer structure together to form a unit. When materials other than titanium are used to construct the thermo-barrier material, brazing may be the preferred method of joining the inner stacked components. When titanium is used with inconel, for example, a combination of diffusion bonding and brazing is required.

OBJECTS OF THE INVENTION

It is an object of this invention to fabricate a nonfragile and lightweight thermal barrier material for use as a thermo-protection for the inner surfaces of spacecraft type vehicles to protect their payloads and possibly human inhabitants during launching and reentry.

A still further object of this invention is to provide thermal barrier material that is easily attached and removed from its attached or supporting structure.

These and other objects and advantages of the invention will become better understood by reference to the following detailed description when considered with the drawings, in which:

DETAILED DESCRIPTION OF THE FIGURES

Figure 1:
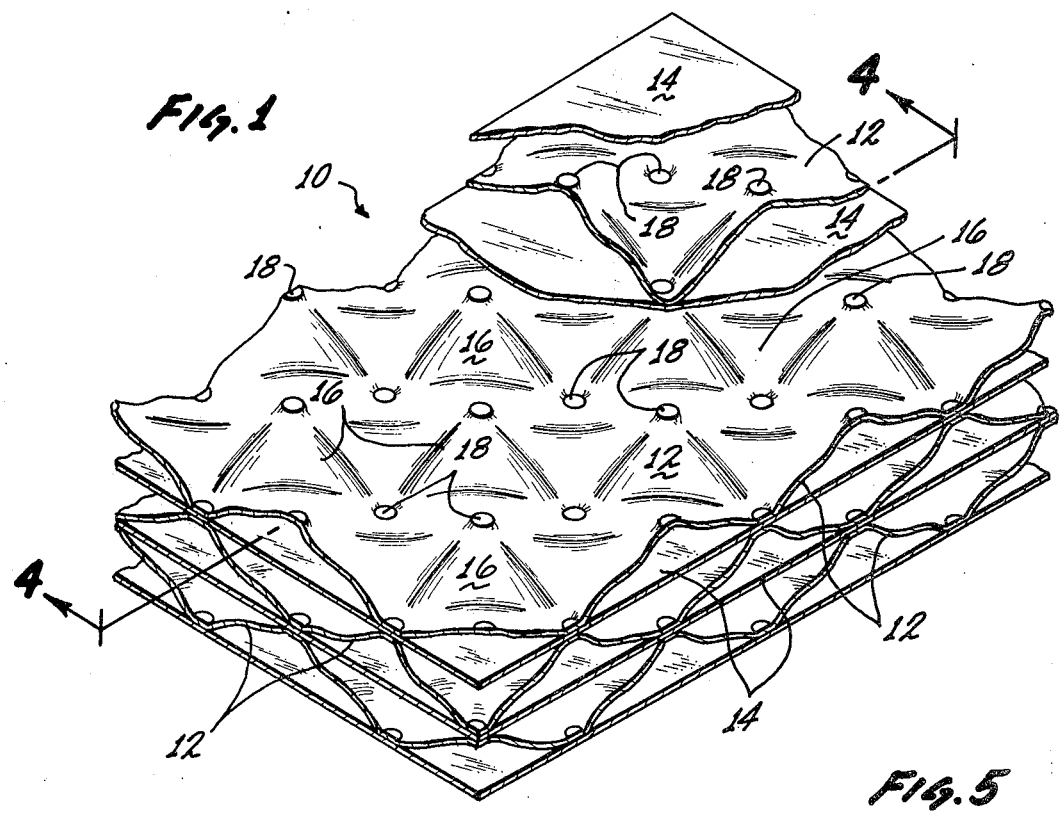
FIG. 1 is a perspective partially sectional cutaway showing of the thermo-barrier structure.
Figure 5:
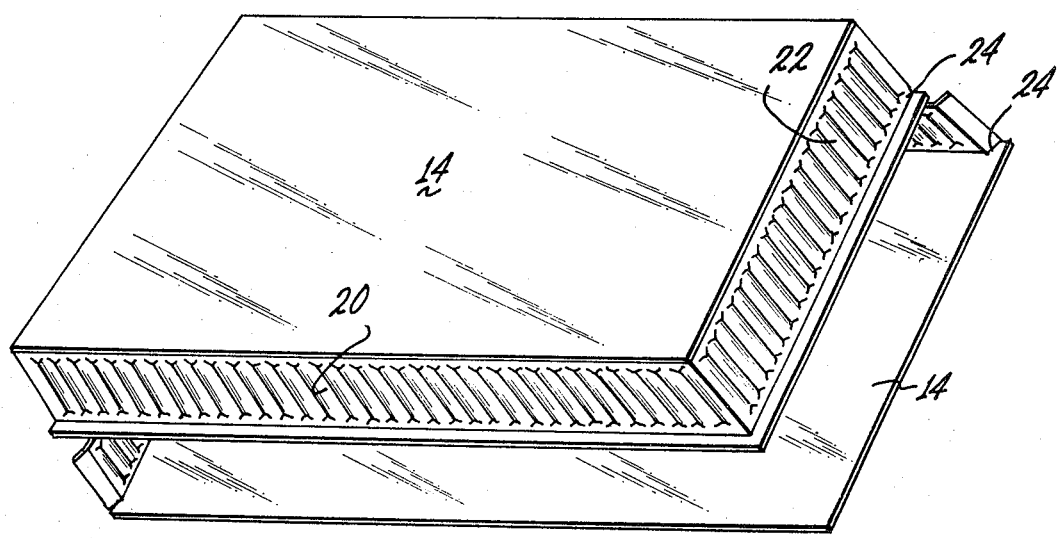
FIG. 5 is a showing of the outer flat sheet material with sealing lip extensions.
Figure 2:
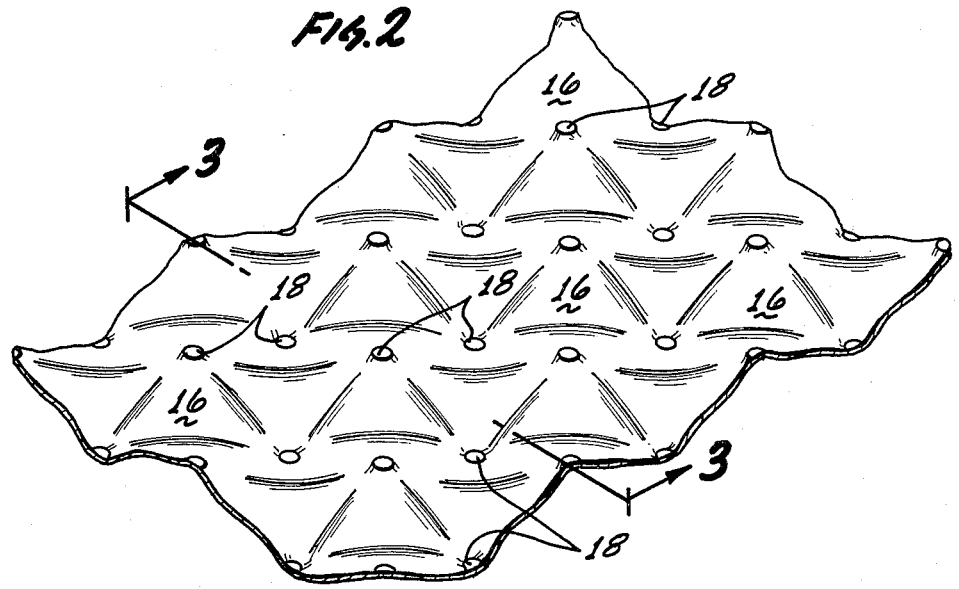
FIG. 2 is a partly sectional perspective fragmentary view of the cellular core material.
Figure 3:
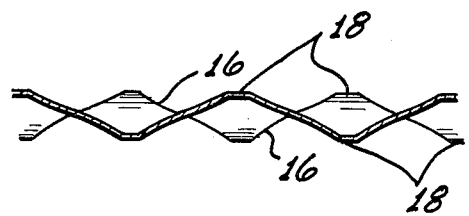
FIG. 3 is a showing of FIG. 2 taken along line 3—3.

Referring now to the various figures, FIG. 1 shows a perspective sectional cutaway view of the thermo-barrier material 10 of the instant invention. The thermo-barrier material 10 comprises central cellular cores 12 sandwiched between flat sheet material 14. Although four cores 12 are shown along with three inner sheets of flat sheet material and two outer sheets of flat sheet material, it should be clearly understood that as few as three cores 12, two inner sheets of flat sheet material and two outer sheets of flat material may be utilized to practice this invention. The maximum number of cores 12 and accompanying sheets of flat sheet material 14 is unknown and would be determined by size and construction limitations. The number of cores 12 and accompanying sheets of flat sheet material 14 are determined by the required heat differential between one outer surface which is exposed to a heat source (the hot face) and the opposite surface (the cold face).

The core 12 is typically from 0.093 to 0.250 inches in thickness, the inner sheets of flat material from 0.001 to 0.003 inches in thickness, with a thickness substantially 0.0015 inches being preferred, and the facing sheets 0.003 to 0.005 inches in thickness.

The cellular core structure comprises a plurality of nodes 16 extending equally in opposite directions from a common midplane. The ends 18 of the nodes 16 are substantially flat and this flat surface is substantially parallel with the core midplane. The flat node ends 18 are shown in the various drawings as circular. It should be understood that these nodes may take any peripheral end configuration providing that the end surface remains substantially flat and parallel with the core midplane.

It may be desirable for some applications of the thermo-barrier material of this invention to evacuate the central cores and adjacent sheets of flat sheet material to provide a dead air space therein to improve the insulation between the hot and cold faces. To accomplish this vacuum seal, each of the end sheets 14 of flat sheet material are extended in length and width and these extensions 20, 22 form one end and one side of the structure. The length of the extensions are substantially equal to the thickness of the stacked material which it will enclose. When placed in position to form the hot and cold face sheets, the outer sheets of flat sheet material form a cocoon around the inner cellular cores and flat sheet material. A sealing lip 24 is provided around the outer edge of the length and width extensions 20, 22. These lips mate with the lips on the opposing face sheet 14 to provide sealing.

Although the discussion and figures are directed toward the forming of rectilinear thermo-barrier material, it should be fully understood that the various components may be formed in any substantially equal curvilinear shapes prior to their assembly and bonding.

The desired overall strength and temperature dissipation range are the principal basis for the choice of the type or types of material used in the construction. Where expected, temperature differentials between the hot and cold face sheets are for example 4 to 1 (1,000 deg F. on the hot face and 250 deg F. on the cold face) titanium preferred because of its light weight. When the temperature differential between the hot and cold face sheet is, say, approximately 10 to 1 (2,000 deg F. on the hot face and 250 deg F. on the cold face), super alloys may be employed. Examples of these super alloys are TD nickel, columbium, inconel, stainless steel and the like.

A METHOD OF MANUFACTURING

When the entire thermo-barrier panel is constructed of titanium, liquid interface diffusion bonding (LID) is the preferred method of joining together the various stacked components. To practice this joining method, the materials of construction are first selected for size. The cellular core material and the adjacent sheets of flat sheet material are sized to substantially equal dimensions. In the event that the outer sheets (the hot and cold face sheets) are to enclose the material for vacuum sealing, two sides of each end sheet of the flat plate material are extended and formed toward the opposite end sheet and the edge of the extensions forms a sealing lip.

The components are then cleaned so as to be free of any surfactants that might affect their joining by this method. Any suitable or well known cleaning methods may be utilized to practice this invention.

The flat surface of the nodes of each sheet of cellular core material are then plated sequentially by well known means with layers of nickel, copper and silver. The plating layers are substantially equal by weight. The ideal range of weight for each layer is from $2\frac{2}{3}$ to $3\frac{1}{2}$ grams per square foot. Layers of substantially 3 grams per square foot each are preferred. It should be understood that the flat sheet material could be plated rather than the nodes to practice this invention.

When a vacuum seal is desired between the outer sheet of flat sheet material, the lip along the extensions is plated in the same manner as the nodes on the edge side adjacent the opposite outer sheet.

Figure 4:
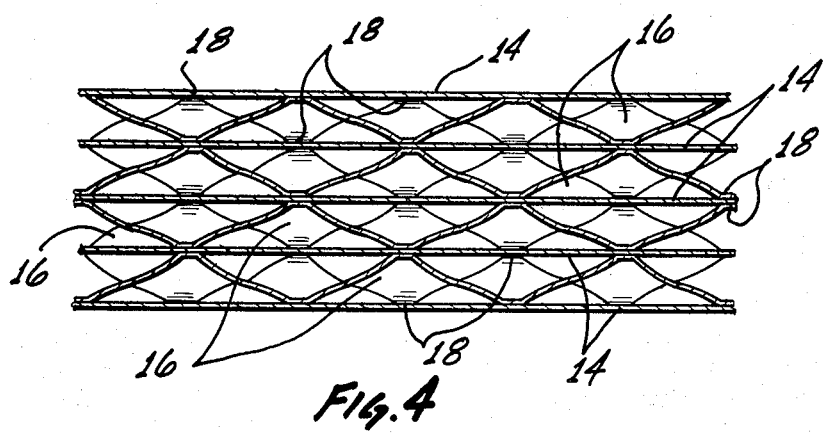
FIG. 4 is a showing of FIG. 1 taken along line 4—4.

The next step is to secure together the cellular core material and the flat sheet material in assembly order, that is, that order as shown in FIGS. 1 and 4. This securing step is to maintain the various components in proper bonding position which includes the substantial vertical alignment of the nodes of the cellular core material. The preferred method of securing the various components together in stacked order is by resistance tack welding. Each component is tack welded at selected locations to each of its adjacent components. It has been found that satisfactory securing is accomplished by placing approximately five welds in each corner of each of the adjacent components.

The secured together components are then placed on a reference surface which has the contour of the stacked components, i.e., rectilinear or curvilinear. The reference surface may be, for example, graphite or like or any other suitable type material for the purpose intended.

A suitable means is used to apply pressure between the stacked components, such as, but not limited to, a dead weight constructed of graphite or the like.

Bonding aids (not shown) are used to control the pressure between the stacked components and the pressure applying means so as to prevent distortion or damage to the component assembly from the required pressure. The outermost components of the assembly are isolated from the reference surface and bonding aids by use of titanium slip sheets, not shown.

The assembly including the reference surface, pressure applying means, and pressure control means are then placed into a vacuum furnace for liquid interface diffusion bonding. The inner heat chamber of the furnace is then evacuated to approximately $1 \times 10^{-5}$ torr, then heated to approximately 940 deg C. and held at this temperature level for approximately 90 minutes. During this time period, the plated material forms a eutectic melt and is diffused into the component materials creating a diffusion bond joint at all of the contacting plated interfaces. The oven is then allowed to cool and the now bonded thermo-barrier material is then removed and subsequently ready for its ultimate use. The assembly having the material outer surface edges bonded cause the inner structure to retain the furnace vacuum of substantially $1 \times 10^{-5}$ torr therein.

A SECOND METHOD OF MANUFACTURE

When the thermo-barrier material is constructed from two different types of material, bi-metal construction, a combination of liquid interface diffusion bonding (LID) and brazing is utilized. Commonly, one material will be titanium which is readily bonded together under the LID method described above and the other material a super alloy which does not LID bond well but may be successfully brazed.

The cellular coil material, for example inconel, is prepared for brazing. At least the nodes are coated with an acrylic binder, such as Nicrobraz 600 cement manufactured by Wall Calmonoy, or the like. While the binder coating is still wet, a powder braze alloy is applied evenly over the binder coated surfaces. The powdered braze alloy used may, for example, have a mesh size from $-140$ to 270. The braze alloy is spray coated on the binder coating by a spray apparatus well known in this art to insure a uniform coating. An example of one spray apparatus is fully described in U.S. Pat. No. 3,656,224.

One or more of the cellular cores may be constructed of titanium as well as their adjacent sheets of flat sheet material. All of the components are selected for size and degreased. The flat surface of the nodes of each of the titanium cellular cores are plated with layers of nickel, copper and silver. The titanium components are then secured together, placed on a reference surface and placed within a vacuum furnace. Pressure applying means and pressure control means are then added to the assembly for bonding. The furnace is then evacuated and its temperature is elevated to a selected level and held at that level until a diffusion bond joint between the components is formed at the nodes.

The components are then stacked in assembly order. The components to be brazed together are secured together by resistance tack welding as hereinbefore discussed or by any other convenient means.

The stacked and secured components are then placed on a reference surface within a vacuum furnace. Pressure is then applied to the stack and is controlled by a pressure control means. The furnace is then evacuated to approximately $1 \times 10^{-5}$ torr. The internal furnace temperature is then elevated to the melting temperature of the braze alloy. The assembly is then cooled and removed from the furnace.

If the outer surfaces are to form a vacuum type seal with the cores and inner flat sheet material, then the surface sheets are formed as discussed above and braze alloy is deposited along the lip joining surfaces.

Although the foregoing invention has been described in some detail in the way of illustrations and examples for purposes of clarity and understanding, it should be understood that certain changes and modifications may be practiced within the spirit of the invention and are limited only by the scope of the appended claims.

What is claimed as new and useful and desired to be secured by United States Letter Patent is:

1. A method of manufacturing thermo-barrier material comprising at least three stacked cellular core structures with nodes projecting in opposite directions from a midplane and flat plate material sandwiched between each of the stacked cellular core structures and positioned on the outer surfaces of the outermost cellular core structure to form outer surface thereon, comprising the steps of:

selecting component material of selected size;

providing a plating material between the node and flat plate material contacting surfaces of at least one of the cellular core structures;

applying a braze alloy to the nodes of the remaining cellular core material;

securing together the cellular core material with braze alloy coated nodes and their associated flat sheet material;

placing the secured together components on a reference surface;

placing the secured together components and reference surface into a furnace;

providing means for applying pressure to the secured components;

evacuating the furnace;

elevating the furnace temperature for melting the braze material;

cooling the furnace and removing the now brazed together components;

securing together the now brazed together components and the remaining components;

placing the secured brazed together and remaining components on a reference surface;

placing the secured brazed together components, remaining components and reference surface into a furnace;

applying a pressure between the brazed together components, remaining components and the reference furnace;

evacuating the furnace; and elevating the temperature within the furnace and maintaining that elevated temperature sufficiently long to cause a eutectic melt of the plating materials and diffuse that plating material into the base material of the adjacent components creating a diffusion bond thereby.

2. The method of claim 1, wherein said plating is applied to the node surface.

3. The method of claim 1, wherein the plating comprises sequentially applying layers of nickel, copper and silver.

4. The method of claim 2, wherein the layers of plating materials are substantially equal by weight.

5. The method of claim 1, wherein the braze material is applied by first spray wetting the surfaces to which the braze material is to be applied with an acrylic binder, and secondly, while the binder is still wet applying a powdered braze alloy thereto.

6. The method of claim 1, wherein the various components are secured together prior to entering the furnace by resistance welding.

7. The method of claim 1, comprising an additional step of providing bonding pressure control means to the secured together components prior to the step of evacuating the furnace.

8. The method of claim 1, wherein the temperature in the last step of elevating furnace temperature is approximately 940 deg C.

9. The method of claim 1 including the additional step of evacuating the inner structure of the termo-barrier material.

10. A thermo-barrier material manufactured by the method of claims 1 or 9.

* * * * *